United States Patent [19]

Perkins

[11] Patent Number: 4,637,628
[45] Date of Patent: Jan. 20, 1987

[54] ANTI-ROLL TORSION BAR ARRANGEMENT FOR VEHICLE REAR SUSPENSION

[75] Inventor: David J. Perkins, Royal Oak, Mich.

[73] Assignee: Chrysler Motors Corporation, Highland Park, Mich.

[21] Appl. No.: 803,445

[22] Filed: Dec. 2, 1985

[51] Int. Cl.[4] .................. B60G 19/00; B60G 21/00
[52] U.S. Cl. ............................... 280/689; 267/57; 280/700; 280/723
[58] Field of Search ............... 280/689, 700, 721, 723; 267/57

[56] References Cited

U.S. PATENT DOCUMENTS

| | | | |
|---|---|---|---|
| 3,473,821 | 10/1969 | Barenyi et al. | 267/57 |
| 3,615,081 | 10/1971 | Ravenel | 280/723 |
| 3,615,103 | 10/1971 | Dohring et al. | 280/723 |
| 4,140,333 | 2/1979 | Thoraval et al. | 280/700 |
| 4,165,099 | 8/1979 | Wagner et al. | 280/708 |
| 4,234,205 | 11/1980 | Thiesce | 280/723 |
| 4,415,178 | 11/1983 | Hatsushi et al. | 267/57 |
| 4,491,342 | 1/1985 | Aubry | 280/700 |
| 4,544,180 | 10/1985 | Mary et al. | 280/689 |

Primary Examiner—John J. Love
Assistant Examiner—Kenneth R. Rice
Attorney, Agent, or Firm—Edward P. Barthel

[57] ABSTRACT

An improved rear axle beam assembly for a trailing arm suspension system. The beam assembly comprises a tubular member extending transversely between the vehicle rear wheels. A pair of first and second outer sleeves, each fixed to the rearward end of a trailing arm, concentrically surround the respective outboard end portions of the tubular member. The first sleeve is fixedly attached to the one end portion of the tubular member while the second sleeve is journally mounted on the other end portion of the tubular member. A pair of first and second wheel support castings each having a collar portion defining an axial bore fixedly receiving therein the outboard end of an associated outer sleeve. An anti-roll torsion bar is axially positioned in the journaled second sleeve end portion of the tubular member. The torsion bar includes a head plate on its outboard end fastened to its associated second casting with the bar's inboard end pinned to the tubular member thereby maintaining the dimensional relationship between the left and right castings. The tubular member other end portion may rotate relative to the second sleeve upon opposite pivotal movement of the trailing arms thereby twisting the torsion bar and increasing the roll stiffness of the suspension system.

3 Claims, 6 Drawing Figures

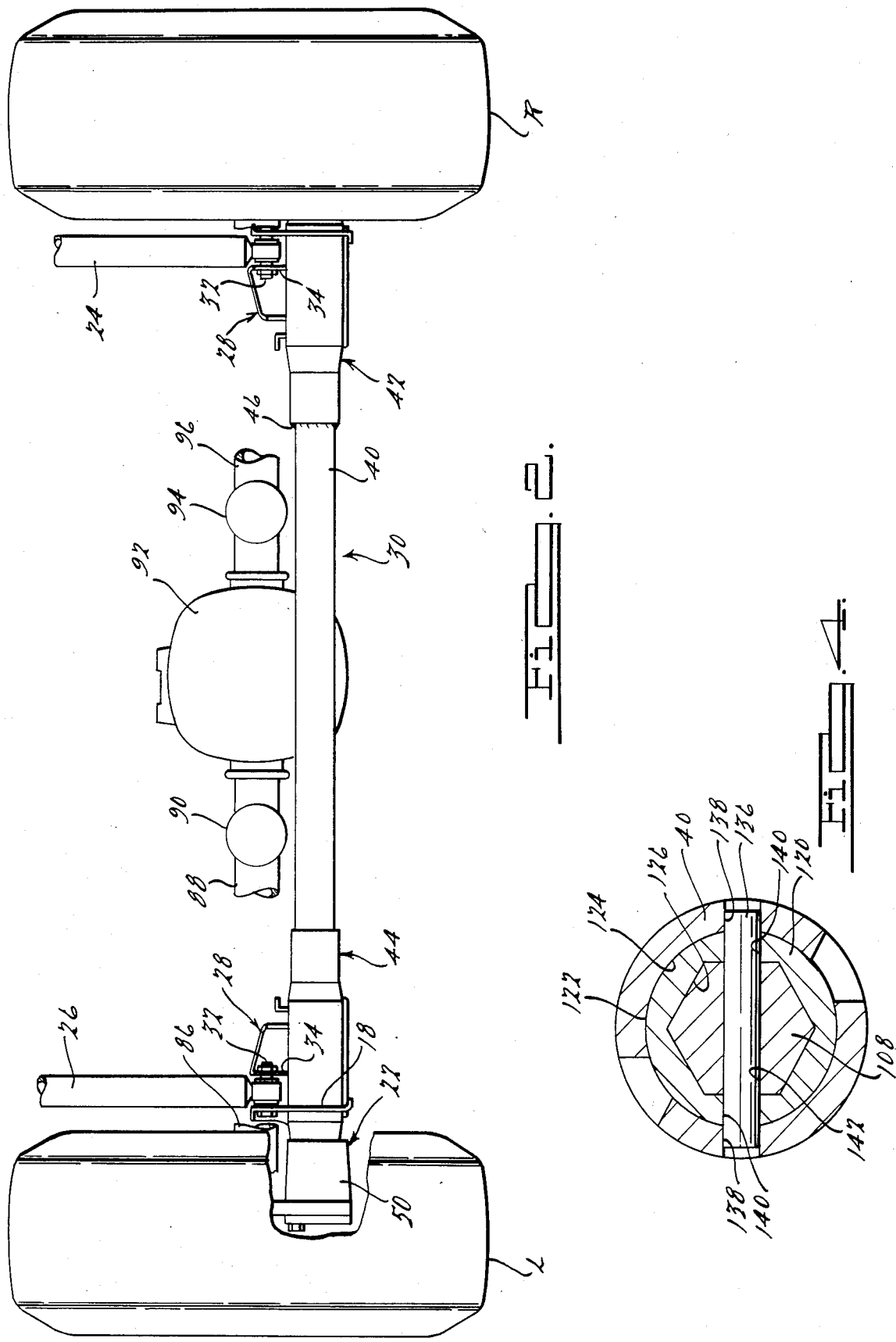

ANTI-ROLL TORSION BAR ARRANGEMENT FOR VEHICLE REAR SUSPENSION

BACKGROUND OF THE INVENTION

The present invention relates generally to rear axle suspension for vehicles and more particularly to an anti-roll torsion bar arrangement for a rear axle trailing arm suspension system.

Many anti-roll or swaybar arrangements have been proposed for vehicle rear wheel suspensions having the wheels mounted independently on substantially longitudinal arms pivoted about transverse axis. One such arrangement is disclosed in U.S. Pat. No. 3,615,103 issued Oct. 26, 1971, to Dohring et al wherein a stabilizer torsion bar is located inside a pair of coaxial wheel supporting pivot tubes.

The U.S. Pat. No. 4,140,333 issued Feb. 20, 1979 to Thoraval et al; concerns a rear-axle trailing wheel arm suspension system providing semi-axles in the form of extensions attached to each arm and aligned transversely of the vehicle. Left and right torsion bars are provided having their outer ends anchored in housings while their inner ends are fixed in the interior of each semi-axle.

The U.S. Pat. No. 4,491,342 issued Jan. 1, 1985 to Aubry discloses yet another vehicle wheel suspension system incorporating coaxial tube damping and anti-roll means. The Aubry system comprises an assembly of two concentric tubes coaxial to a transverse axis about which wheel support arms oscillate. The tubes are fast with each other near the center of their length while the arms are fast with the ends of the outer tube. The ends of the outer tube may rotate at least in a limited manner abut the transverse axis while the inner tube is connected to the chassis of the vehicle by its two ends.

The U.S. Pat. No. 4,544,180 issued Oct. 1, 1985 to Maru et al discloses a trailing link type beam suspension wherein the axle beam is a hollow tubular member receiving a torsion bar stabilizer. The bar has one end inserted into the axle beam to an intermediate depth thereof and held by a ring-shaped rubber holding member. The other end of the bar is connected to an associated trailing arm through a cylindrical member, arm and a link so that the bar is never swung with respect to the chassis unless the second trailing arm rotates.

SUMMARY OF THE PRESENT INVENTION

In the motor vehicle rear suspension system of the instant disclosure, the sprung part of the vehicle is supported on a tubular cross-beam assembly by left and right coil springs. A pair of left and right longitudinal arms are pivotally connected to the vehicle body and to left and right brackets fixed to the cross-beam assembly. The cross-beam assembly comprises an inner tubular member having its outboard ends inserted in left and right concentric outer sleeve portions. The right sleeve portion is fixed to the inner tubular member while the left sleeve portion is journally supported on the inner tubular member for relative rotational movement thereto. The outboard ends of the sleeve members are fixed to associated left and right wheel support castings.

An anti-sway torsion bar assembly includes a torsion bar and a normally disposed attachment disc-like plate fixedly secured at its center to the outer end of the bar. The torsion bar extends axially within the inner tubular member open left end and is aligned on its principal axis. The torsion bar is formed with integral enlarged head portions at each end with each head having a hexagonal cross-section. The bar outboard head portion is slidably received in a complementary hexagonally shaped transversely extending socket formed in the left wheel support casting. The bar attachment plate is secured to the left wheel support casting by conventional threaded fasteners.

The torsion bar inboard head portion is slidably received in an annular bushing fixed within the inner tubular member. The bushing has an inner hexagonally shaped mating bore slidably receiving the torsion bar inner hex head. Suitable attachment means, such as a through cross pin, locks the torsion bar inner head portion against axial movement relative to the inner tubular member. Thus a feature of the torsion bar assembly is that its effect is twofold. It increases the roll stiffness of the trailing arm rear suspension and at the same time increases its lateral dimensional rigidity by positively locking the inner tubular member to the left wheel support casting in a readily assembled manner.

It is another feature of the present invention to provide an anti-roll torsion bar arrangement for a vehicle rear suspension system adapted to incorporate either a front wheel drive train or a four wheel drive train.

BRIEF DESCRIPTION OF THE DRAWINGS

These and other objects and features will become apparent to those skilled in the vehicle wheel suspension art upon reading the following description with reference to the accompanying drawings in which;

FIG. 3 is a fragmentary enlarged top sectional view of the suspension adjacent the left wheel;

FIG. 4 is an enlarged sectional view taken on the line 4—4 of FIG. 3;

DESCRIPTION OF THE PREFERRED EMBODIMENT

Figure 1:
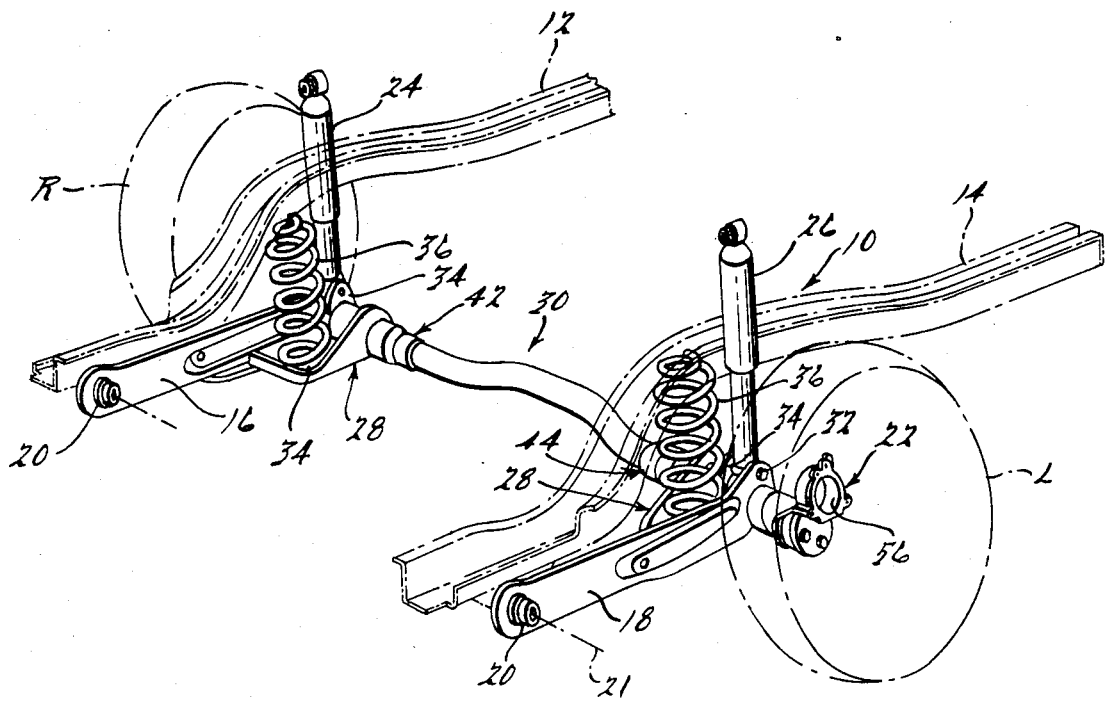
FIG. 1 is a perspective view of the rear suspension assembly of the prevent invention.

Referring now to the drawings, and in particular to FIG. 1, a suspension system 10 is illustrated designed to be carried by a pair of longitudinally extending vehicle side rails 12 and 14 of the type shown in U.S. Pat. No. 4,165,099 issued Aug. 21, 1970 to Wagner et al. The Wagner et al patent is assigned to the assignee of the present application the disclosure of which is incorporated by reference herein.

The suspension system 10 consists essentially of a pair of longitudinally extending trailing control arms 16,18 adapted to be pivotally connected at their forward ends to the vehicle side rails 12 and 14 by pivot bushings 20. Thus, the control arms undergo opposite pivotal movement about their transverse pivot axis 21 in response to opposite vertical deflection of the rear road wheels. A pair of wheel support members or castings are provided for supporting left "L" and right "R" wheels at the ends of control arms 16,18. Only the wheel support casting 22 is shown for supporting the wheel L at the aft end of control arm 18. A pair of right and left shock absorbers 24,26 of known design are interconnected between the motor vehicle body (not shown) and right and left brackets 28. The brackets 28 are fixedly spaced inwardly from the control arms on a transversely extending beam axle or cross member assembly 30.

A pivot bolt 32 connects the lower end of each shock absorber 24,26 intermediate its associated bracket outboard ears 34 and the aft end of its associated control arm. The brackets 28 have a horizontal plate portion 34 extending forwardly from the cross member assembly 30 which support the lower end of its associated right and left coil spring 36. The frame side rails 12 and 14 are provided with an upper spring seat (not shown) so that the vehicle superstructure is resiliently supported relative to the wheels R and L in a conventional manner.

Figure 2:
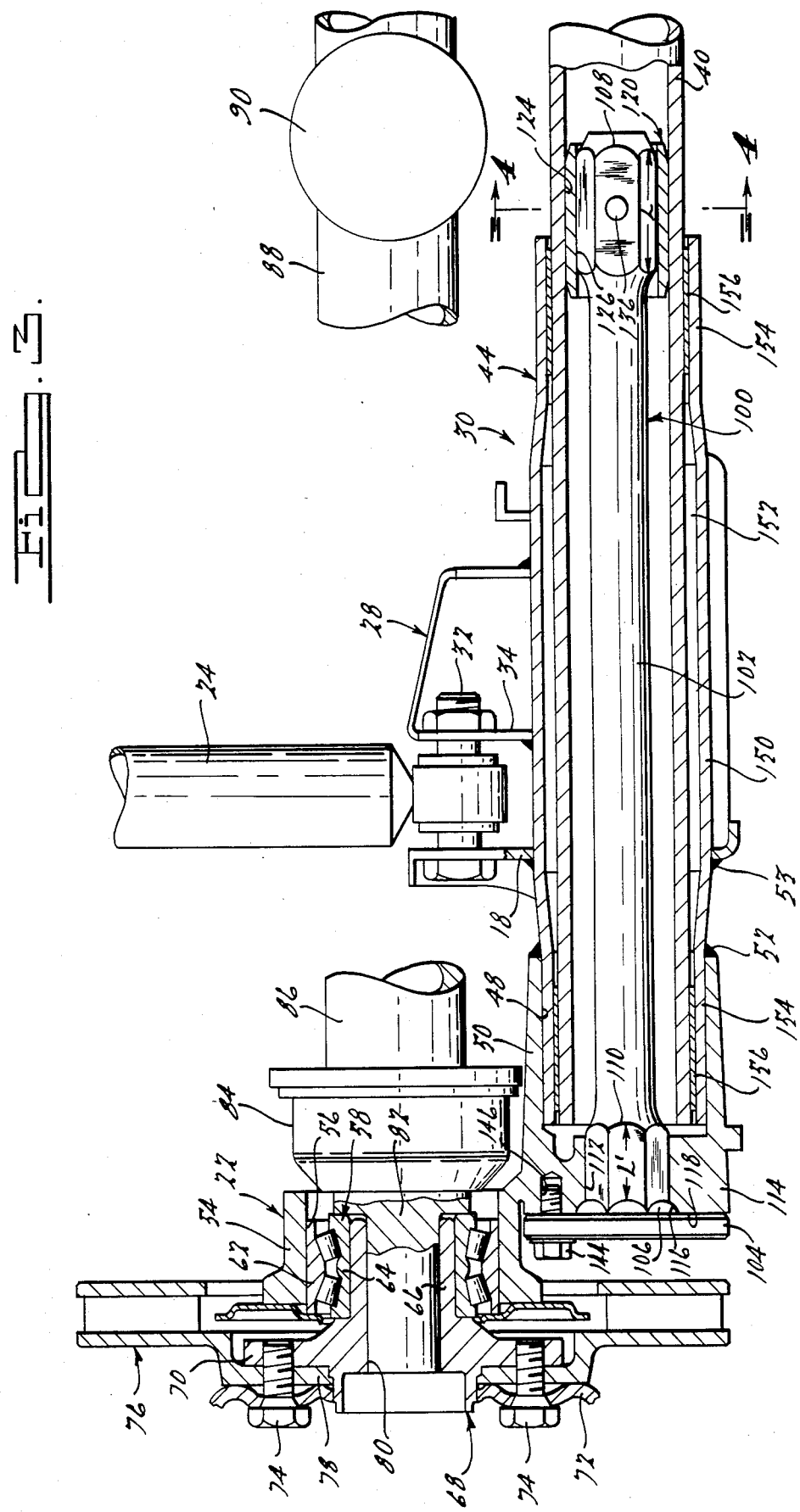
FIG. 2 is a fragmentary top plan view with parts broken away of a suspension according to the present invention.

As best seen in FIGS. 2 and 3 the cross-member assembly 30 comprises a transversely extending inner tubular member 40 having its outboard ends telescopically received in right and left outer sleeve portions 42 and 44, respectively. The right sleeve portion 42 concentrically surrounds a right outboard linear end portion of the inner tubular member 40 and is fixedly secured thereto as by circumferential weld 46. The outboard end of right sleeve portion 42 is fixedly joined to the right wheel support (not shown) in the same manner as the left sleeve portion 44.

FIG. 3 shows the outboard end of left sleeve portion 44 fixedly positioned in a press fit manner within an annular socket 48 formed in inner collar portion 50 of the left wheel support member 22. The wheel support members 22 are preferably in the form of left and right integral castings. As the wheel support castings 22 are mirror images of each other only the left casting is shown and described. The left sleeve portion 44 is also welded as at 52 to the inner collar portion 50 free edge to complete the press fit connection. Such a connection is shown and described in the above mentioned U.S. Pat. No. 4,533,157. Both sleeves are fixed to their associated control arms as shown, for example by weld 53.

As further seen in FIG. 3 the left wheel support casting 22 has an integral outer collar portion 54 defining an inner transverse bore 56. The bore 56 supports therein a dual tapered roller bearing assembly 58. Outer race 62 of the bearings assembly 58 is fixed to the internal surface of the collar portion 54 while its inner race 64 is fixed to axial hub flange 66 of left wheel hub 68. The hub 68 has a radial flange 70 detachably connected to wheel disc 72 of wheel L by machine bolts 74. A wheel disc brake 76 is shown having its inner radial flange 78 sandwiched between the disc 72 and hub radial flange 70.

The hub 68 has an inner bore 80 adapted to receive an outboard centralized drive shaft 82 integral with an outer constant velocity joint 84. The joint 84 is of a conventional form such as the joints shown in U.S. Pat. No. 4,504,099 issued Mar. 12, 1985 to Miki et al. The joint 84 includes a spindle portion 86 extending from the inboard end and suitably connected to an intermediate drive shaft shown at 88 in FIG. 2. An inner constant velocity joint 90 is provided joining the intermediate drive shaft 88 to a conventional bevel gear rear wheel drive differential 92. The rear differential 92 is connected to wheel R by a second inner constant velocity joint 94 and an intermediate drive shaft 96 in an identical manner as wheel L.

With reference to FIG. 3 there is shown an anti-sway torsion bar assembly 100 extending axially within the inner tubular member 40 and aligned on the principal transverse axis thereof. The torsion bar assembly 100 includes a cylindrical torsion bar 102 and an attachment end plate or disc 104 fixedly secured to the outboard end of the bar as by welds at 106. The disc 104 is disposed normally to the disc inner surface and aligned on the disc axis of symmetry.

Figures 5, 6:
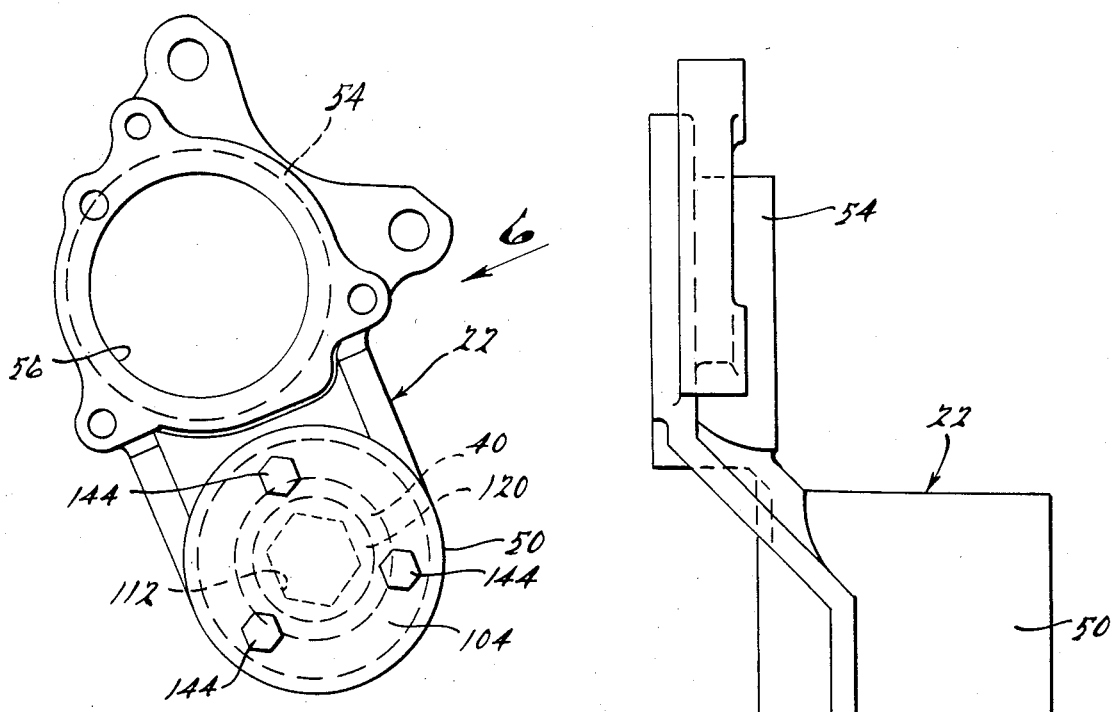
FIG. 5 is an end elevational view of the wheel attaching casting.
FIG. 6 is a rear elevational view of the casting of FIG. 5 looking in the direction of arrow 6.

As seen in FIGS. 3, 4 and 5 the torsion bar 102 has integrally formed at each end polygonal cross-sectioned inboard 108 and outboard 110 enlarged head portions. The outboard head portion 110 is slidably received in a complementary polygonal cross-section shaped transverse bore 112 formed in base wall 114 of the wheel support casting 22. Opening 112 has its outboard end chamfered at 116 to allow the disc welds 106 to seat in a flush manner on outboard face 118 of the base wall 114.

FIG. 3 shows the torsion bar 102 extending axially into the tubular member 40 a predetermined distance such that its inboard head portion 108 is telescopically received in annular bushing 120. The bushing 120 has its outer periphery, shown at 122 in FIG. 4, suitably secured as by welding, to inner surface 124 of the inner tubular member 40. The bushing 120 has an inner polygonal cross-sectioned bore 126 complementary to the polygonal crosssectioned torsion bar head portion 108.

In the disclosed embodiment the polygonal crosssectioned inboard 108 and outboard 110 head portions and their complementary bores 126 and 112 respectively, are hexagonal in cross-section. It will be noted that the hexagonal sectioned opening 112 and the hexagonally sectioned bore 124 are aligned with their respective six hex faces in common transversely extending planes. In a like manner the respective six hex faces of torsion bar outboard and inboard head portions 110 and 108 are arranged in common transversely extending planes.

It will be observed in FIG. 3 that the axial dimension "L" of the hex faces of inboard bar head portion 108 are a predetermined distance greater than the axial dimension "L'" of the hex faces of bar outboard head portion 110. Thus, the hex faces of head portion 108 are initially received in the bushing bore 126 prior to the hex faces of head portion 110 subsequently being received in opening 112. Because of this sequential arrangement the hex faces of head portion 108 pre-align the hex faces of head portion 110 for subsequent insertion of the outboard head portion in its associated bore 112.

Upon the insertion of the torsion rod into the position shown in FIG. 3 a cross-pin type fastener such as a slotted spring pin 136 is inserted through aligned apertures 138 in inner tubular member 40, aligned aperture 140 on bushing 120 and cross bore 142 in bar end 108. In this way the torsion bar 102 is positively locked to the cross axle assembly 30.

As seen in FIG. 5 the plate 104 has a plurality of fasteners or machine bolts 144 threadably received in associated bores 146 to fixedly mount the torsion bar assembly 100 to the wheel support member 22. Thus, the anti-sway bar assembly provide means to readily affix the cross-member 30 to the wheel support member 22 in addition to providing the sole anti-roll arrangement for the vehicle.

In FIG. 3 it will be seen that the sleeve portion 44 central portion 150 is expanded to provide a circumferential clearance space 152 between the sleeve and inner tubular member 40. The sleeve portion 44 has its end portions 154 reduced in diameter to a predetermined size such that journal bearings 156 surround the end portions 154. This allows the left sleeve portion 44 to be journally supported for limited rotation relative to the inner tubular member 40 about the principal axis of the torsion bar 102.

In operation when the left arm 18 pivots about its bushing axis 21 it causes the tubular member 40 left end portion to rotate relative to left sleeve 44 creating a torsion in bar 102 and resultant resilient deflection of the cross-member axle beam assembly 30 responsive to opposite vertical pivotal movement of the control arms 16 and 18. However, any tendency toward torsioned or twisting deflection of the control arms 16 and 18 induced by vehicle cornering is resisted by their rigid connection with the axle assembly 30 which is structurally resistant to bending loads.

A feature of the invention is that the axial dimension of the torsion bar 102 is only about one fourth the overall axial dimension of the cross-beam axle assembly. Thus, a compact anti-roll torsion bar structure is provided that is readily assembled and dis-assembled while the torsion bar assembly 100 positively insures the transverse dimensional relationship between the right and left wheel support castings. This results upon the ready securing of fasteners 144 and cross-pin 136, wherein the wheel mounting castings are locked in fixed axial relationship.

Although only one embodiment of the invention has been disclosed and described, it is apparent that other embodiments and modifications of the invention are possible.

What is claimed is:

1. A rear axle suspension apparatus for the rear wheels of a motor vehicle, the suspension apparatus comprising:

a pair of rearward extending control arms;

means for mounting the forward end of each said control arm to the chassis of said vehicle for pivotal movement about an axis transverse to the longitudinal axis of said vehicle;

a rear axle cross-beam assembly secured at the rearward ends of said control arms, said rear axle cross-beam assembly comprising;

a cylindrical sectioned tubular member extending transversely such that its outboard end portions are each located adjacent to one of said wheels; a pair of first and second outer cylindrical sleeves, said first sleeve concentrically surrounding one outboard end portion of said tubular member so as to be fixedly secured thereto, said second sleeve concentrically surrounding the other outboard end portion of said tubular member so as to be supported by journal means for limited rotation relative to said inner tubular member; each said first and second sleeve being fixedly connected to the rearward end of an associated one of said control arms;

a pair of mirror image first and second castings, each said casting having a inboard collar portion and an outboard wheel support portion; each said casting wheel support portion supporting an associated rear wheel mounting means thereon such that said casting wheel support has its transverse rotational axis offset from the transverse principal axis of said inboard collar portion; each said collar portion defining a transversely aligned bore fixedly receiving therein the outboard end of its associated first and second sleeve;

a single transversely extending anti-roll torsion bar having a predetermined axial dimension of about one fourth the overall axial dimension of said rear axle cross-beam assembly, said anti-roll torsion bar extending axially in a substantially co-extensive manner within said second sleeve and in concentrically spaced relation within said tubular member other outboard end portion;

an annular bushing fixedly received within said tubular member, said torsion bar having an enlarged inboard and outboard head portion at each end thereof whereby said head portions are formed with identical polygonal cross-sections, said outboard head portion having an attachment end plate fixed thereon disposed normal to the principal axis of said torsion bar, said annular bushing having a polygonal cross-section transversely extending bore provided therein shaped complementary to said torsion bar inboard head portion for slidable reception therein;

said second casting inboard collar portion having a polygonal cross-section transversely extending bore therein shaped complementary to said torsion bar outboard head portion for slidable reception therein, said torsion bar head portions each defining a plurality of faces located in common transversely extending planes, said torsion bar inboard and outboard head portions being slidably received in their respective tubular member annular bushing bore and second casting inboard collar portion complementary shaped bore;

such that with said end plate secured by fastener means to said second casting and said inboard head portion secured within said annular bushing by a cross-pin, said torsion bar positively maintains a fixed transverse dimensional relationship between said first and second castings;

and whereby said tubular member being rotatable in a limited manner relative to said second sleeve by said journal means upon opposite pivotal movement between said control arms resulting in said anti-roll torsion bar being subjected to torsion resisting said control arms opposite pivotal movement so as to increase the roll stiffness of the rear axle suspension apparatus.

2. The rear axle suspension apparatus as set forth in claim 1 wherein each said first and second casting outboard wheel support portion in the form of a collar portion having a transversely aligned bore adapted to journally support associated first and second rear road wheel drive shafts therein, said first and second rear drive shafts connected by universal joint means to a central rear wheel drive differential wherein said rear axle suspension apparatus being adapted for use with a four-wheel drive vehicle.

3. The rear axle suspension apparatus as set forth in claim 1, wherein said torsion bar outboard and inboard head portions having identical hexagonal cross-sections each defining six hex faces in common transversely extending planes, and wherein the axial dimensions of the hex faces of said inboard head portion being of a predetermined distance greater than the axial dimension of the hex faces of said outboard head portion, such that said inboard head portion is initially received in its associated complementary shaped annular bushing bore prior to said outboard head portion being received in its complementary shaped inboard collar portion bore so as to pre-align said outboard head portion hex faces relative to said second casting for subsequent ready insertion in its associated complementary shaped bore.

* * * * *